United States Patent Office 3,431,289
Patented Mar. 4, 1969

3,431,289
HERBICIDAL, HALOGENATED UREA DERIVATIVE
Heinz-Eberhard Freund and Friedrich Arndt, Berlin, Germany, assignors to Schering A.G., Berlin, Germany
No Drawing. Filed Feb. 24, 1966, Ser. No. 538,490
Claims priority, application Germany, Mar. 12, 1965, Sch 36,680; Apr. 1, 1965, Sch 36,816
U.S. Cl. 260—453                                     1 Claim
Int. Cl. C07c *127/00*

ABSTRACT OF THE DISCLOSURE

Herbicidal agent of the general formula

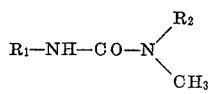

in which $R_1$ represents 4-iodophenyl, 3-chloro-4-iodophenyl, or 3,4-dibromophenyl, and $R_2$ methoxy; or if $R_1$ is 3,4-dibromophenyl, also methyl.

---

The present invention relates to selective herbicidal agents. More particularly, it relates to herbicidal agents containing new urea derivatives, and to methods for their manufacture or production.

The use of urea derivatives, for example, N-(4-chlorophenyl)-N',N'-dimethyl urea and N-(3,4-dichlorophenyl)-N',N'-dimethyl urea as herbicides for total weed control is known. Such herbicides, however, have no selective properties and are therefore not suitable for weed control in the sowing of crops.

Also the use of urea derivatives, such as N-4-(p-chlorophenoxy)-phenyl-N',N'-dimethyl urea, N - (3,4-dichlorophenyl) - N - methoxy-N'-methyl urea, and N-(4-chlorophenyl)-N-methoxy-N'-methyl urea, as selective weed control agents is known. The first named urea, however, has no importance for use in cereals and presents moreover the disadvantage of a limited time of application, which for reliable action should best occur shortly before germination of the weeds between the second and twelfth day after sowing. The last named ureas do not have a selective effect if they are sprayed on the plants after the germination of, for example, peas.

Other urea derivatives of previously minor practical importance, as N-(3-chloro-4-bromophenyl)-N',N'-dimethyl urea, also have a harmful effect in sowings of peas and wheat.

It has now been found that agents containing as an active ingredient at least one compound of the following general formula:

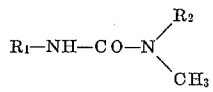

in which $R_1$ represents 4-iodophenyl, 3-chloro-4-iodophenyl, or 3,4-dibromophenyl, and $R_2$ methoxy; or if $R_1$ is 3,4-dibromophenyl, also methyl; are less harmful to crops than the known urea derivatives and can find use as selective herbicides both in pre-germination and in post-germination treatment.

Particularly surprising is the fact that the agents of the present application are extremely compatible with germinated peas and young cereals when they are sprayed directly over the leaves. It is thus possible to treat cereal and pea crops as well as mixed sowings of cereals and peas with the urea derivatives according to the invention. Also, carrots have proved extremely compatible. Similarly good properties are not found in any of the ureas known until now to have a herbicidal effect.

It is surprising to note that the agents according to the present invention are extremely compatible also when used in the presowing or pregermination method in cereals. Thus it becomes possible also for cereals to couple the operation of spraying with sowing and cultivation, if desired. Above all, weeds are eliminated, as competitors against the growing crops, during the germination of the cultivated plants by preventive control herein indicated.

The new urea derivatives can be produced, for example, by the following reactions:

(a) Substituted phenyl isocyanates of the general formula

in which $R_1$ has the above-mentioned meaning, with O,N-dimethylhydroxylamine or dimethylamine, (b) Substituted anilines of the general formula

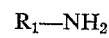

in which $R_1$ has the above-mentioned meaning, with N-methoxy-N-methyl carbamic acid derivatives, preferably halides, or with the corresponding N,N-dimethyl derivatives, (c) Substituted urea of the general formula

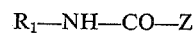

in which $R_1$ has the above-mentioned meaning, and Z represents

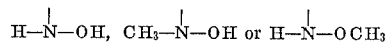

with methylating agents, or (d) Ureas of the general formula

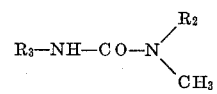

in which $R_2$ represents methoxy or methyl, and $R_3$, phenyl, 3-chlorophenyl, or 3-bromophenyl, with brominating or iodenating agents.

One may bring about the above reactions either in the presence or in the absence of diluents. Suitable diluents are, for example, water, benzene, toluene, dimethyl formamide, methanol and acetonitrile. Methylating agents for the process indicated under (c) above are, for example, dimethyl sulfate and p-toluene sulfonic acid methylester.

The following examples will explain the production of the new urea derivatives:

EXAMPLE 1

Production of N-(3-chloro-4-iodo-phenyl)-N'-methoxy-N'-methyl urea 4.9 g. (=0.05 mole) of O,N-dimethylhydroxylamine-hydrochloride is dissolved in 60 ml. of water, 2.7 g. of anhydrous sodium carbonate are then added. After about 15 minutes at 10 to 20° C., ice cooling, there is added drop by drop, a solution of 14.0 g. (=0.05 mole) of 3-chloro-4-iodo-phenylisocyanate in 40 ml. of benzene. After further agitation for one hour, the benzene is distilled under vacuum, and the resultant precipitate is removed by suction, which is washed out with water, dried and finally recrystallized by use of light gasoline.

Yield: 16.0 g.=94.0% of the theoretical yield.
M.P.: 89 to 90° C.

EXAMPLE 2

Production of N-(4-iodo-phenyl)-N'-methoxy N'-methyl urea 97.3 g. (0.35 mole) of N-(4-iodo-phenyl)-N'-hydroxy urea are mixed in 600 ml. of methanol, 90 ml. of dimethyl sulfate are added and then in about 30 minutes at 15 to 20° C. (ice cooling), 85 ml. of a 34% soda solution are added drop by drop, with agitation. After additional agitation for one hour, the methanol to a large extent is distilled off and the residue is diluted with water. The resultant precipitate is then removed by suction, while washing it with water and then drying.

Yield: 88.3 g.=82.5% of the theoretical yield.
M.P.: 92 to 94° C.

By recrystallization from light gasoline, one obtains an analytically pure product having a M.P. of 93 to 94° C.

EXAMPLE 3

Production of N-(4-iodo-phenyl)-N'-methoxy-N'-methyl urea 21.9 g. (=0.1 mole) of 4-iodo-aniline and of 14 ml. (=0.1 mole) of triethylamine are dissolved in 100 ml. of acetonitrile. Slowly and with agitation at room temperature, 12.4 g. (=0.1 mole) of N-methoxy-N-methyl-carbamic acid chloride are added to 50 ml. of acetonitrile. After agitation for one hour, the reaction mixture is poured into iced water, the resultant precipitate is removed by suction, washed well with water, and dried. Finally, the product is recrystallized out of light gasoline.

Yield: 26.0 g.=85.0% of the theoretical yield.
M.P.: 93 to 94° C.

EXAMPLE 4

Production of N-(3-chloro-4-iodo-phenyl)-N'-methoxy-N'-methyl urea 32.6 g. (=0.1 mole) of N-(3-chloro-4-iodo-phenyl)-N'-methoxy urea is suspended in 150 ml. of methanol, 10.5 ml. (=0.11 mole) of dimethyl sulfate, are then added and then there is added drop by drop and with agitation at 15 to 20° C. (ice cooling), 4.8 g. (=0.12 mole) of sodium hydroxide in 10 ml. of water. After additional agitation for one hour, most of the methanol is distilled off and the residue is diluted with water. The resultant precipitate is removed by suction, and washed out well with water, dried, and finally recrystallized out of light gasoline.

Yield: 32.4 g.=95.0% of the theoretical yield.
M.P.: 89 to 90° C.

EXAMPLE 5

Production of N-(3-chloro-4-iodo-phenyl)-N'-methoxy-N'-methyl urea

One proceeds similarly as in Example 4, using N-(3-chloro-4-iodo-phenyl)-N'-hydroxy - N' - methyl urea as starting material, and p-toluene-sulfonic acid methylester as the methylating agent. The crude product is recrystallized out of light gasoline.

Yield: 31.0 g.=91.0% of the theoretical value.
M.P.: 89 to 90° C.

EXAMPLE 6

Production of N-(3-,4-dibromo-phenyl)-N',N'-dimethyl urea (a) 4.5 g. (=0.1 mole) of dimethylamine in 100 ml. of water are added slowly drop by drop at 10 to 20° C. (ice cooling) and with agitation, to a solution of 27.7 g. (=0.1 mole) of 3,4-dibromo-phenyl-isocyanate in 100 ml. of benzene. After additional agitation for about one hour the benzene is distilled off in vacuum. The resultant precipitate is removed by suction, washed with water, dried, and finally recrystallized out of benzene.

Yield: 30.1 g.=93.5% of the theoretical value.
M.P.: 166 to 167° C.

(b) To a solution of 25.1 g. (=0.1 mole) of 3,4-dibromo-aniline and 14 ml. (0.1 mole) of triethylamine in 100 ml. of acetonitrile, there is added drop by drop and with agitation, at room temperature, 10.8 g. (=0.1 mole) of N,N-dimethyl-carbamic acid chloride in 50 ml. of acetonitrile. After additional agitation for one hour, the reaction mixture is poured into iced water, the resultant precipitate is removed by suction, washed with water, dried, and finally recrystallized out of benzene.

Yield: 28.0 g.=87.0% of the theoretical yield.
M.P.: 166 to 167° C.

(c) To a solution of 8.2 g. (=0.034 mole) of N-(3-bromo-phenyl)-N',N'-dimethyl urea and 2.8 g. (=0.034 mole) of anhydrous sodium acetate in 50 ml. of glacial acetic acid there are added drop by drop, at about 70° C., 1.7 ml. (=0.034 mole) of bromine in 10 ml. of glacial acetic acid. After additional agitation for one hour, the reaction mixture is diluted with water, the resultant precipitate is removed by suction, washed with water, dried, and recrystallized out of benzene.

Yield: 10.3 g.=94.0% of the theoretical yield.
M.P.: 166 to 167° C.

EXAMPLE 7

Production of N-(3,4-dibromo-phenyl)-N'-methoxy-N'-methyl urea (a) One proceeds similarly as in Example 6a, using O,N-dimethylhydroxylamine instead of dimethylamine. The resultant crude product is recrystallized out of light gasoline.

Yield: 30.5 g.=90.5% of the theoretical yield.
M.P.: 99 to 100° C.

(b) One proceeds similarly to Example 6b, using N-methoxy-N-methyl carbamic acid chloride instead of N,N-dimethyl-carbamic acid chloride, and then recrystallizing the crude product out of light gasoline.

Yield: 29.0 g.=86.0% of the theoretical yield.
M.P.: 99 to 100° C.

(c) This urea is obtained similarly using the method in Example 6c by bromination of N-(3-bromo-phenyl)-N'-methoxy-N'-methyl urea, and the subsequent recrystallization out of light gasoline.

Yield: 86.2% of the theoretical value.
M.P.: 99 to 100° C.

The new urea derivatives as herein indicated are insoluble in water, slightly soluble in the aliphatic hydrocarbons, for example, hexane, petroleum ether, light gasoline; soluble to slightly soluble in aromatic hydrocarbons, for example, benzene, toluene, xylene; and soluble to very well soluble in chlorinated hydrocarbons, for example chloroform; alcohols, for example methanol, ethanol, isopropanol, ethers, for example diethyl ether, tetrahydrofuran; ketones, for example acetone, cyclohexanone, isophorone; dimethylsulfoxide and dimethylformamide.

The urea derivatives herein described may be used alone or as mixtures with each other, the mixtures offering special advantages because of their wide range of action. Joint synergistic use with other selective herbicides, as for example, ureas, carbamates, anilides, triazines and/or other substances, for example, fertilizers, is also possible.

The application is effected preferably in a manner common in weed control in the form of preparations, as for example, powders, dusts, granulates, solutions, emulsions, or suspensions, with addition of liquid and/or solid vehicles or diluents and possibly cross-linking, adhesion, emulsifying and/or dispersing agents.

The production of the various preparations is effected in one of the forms customary for plant protectants with the use of liquid or solid inert vehicles or diluents and possible addition of surface-active substances. Suitable liquid vehicles that may be used are for example, water, mineral oils or other organic solvents, such as xylene or other alkylated benzenes, cyclohexanol, cyclohexanone, isophorone, chlorinated hydrocarbons, dimethylformamide, dimethyl sulfoxide, and others. As solid vehicles there may be used for example, lime, kaolin, talcum, natural or synthetic silicic acid, Attaclay and other clays. As suitable surface-active agents, there may be used, for exmple, salts of the lignin sulfonic acids, salts of alkylated benzene sulfonic acids, sulfonated acid amides and their salts, polyethoxylated amines, alcohols and phenols. For selective weed control with the urea derivatives according to the invention, quantities of from about 0.3 kg./ha. and more have proved sufficient.

The herbicidal activity of the agents according to the invention as compared with that of a known agent used in the pre- and post-germination method is evident from the following examples:

EXAMPLE 8

In the greenhouse, with the purpose of killing weeds while in the cotyledonous stage of cultivation, plants and weeds were sprayed and evenly distributed, with (1) N-(3,4-dichlorophenyl)-N-methoxy-N'-methyl urea
(2) N-(3-chloro-4-iodophenyl)-N'-methoxy-N'-methyl urea and
(3) N-(4-iodophenyl)-N'-methoxy-N'-methyl urea From the above findings, it is apparent that there is a definite superiority of the agents according to the invention, over the known preparation is evident.

The following example shows that with a quantity of 0.3 kg. of active substance per hectare, a complete destruction of the weeds was achieved.

EXAMPLE 10

In an experiment in the greenhouse, compounds 2 and 3 listed in Example 8 were sprayed on cultivation plants and weeds after germination of the plants in a quantity of 0.3 kg./ha. and 0.5 kg. of active substance/ha., suspended in 800 liters of water/ha. This resulted in an extremely good herbicidal action even at the very low quantities used.

| | Quantity, kg./ha. | Peas | Carrots | Wheat | Mustard (Sinapis spec.) | Stellaria (S. media) | Frenchweed (Galinsoga parv.) | Groundsel (Senecia vulg.) | Chamomile (Matricaria chamomilla) |
|---|---|---|---|---|---|---|---|---|---|
| Compound: | | | | | | | | | |
| 2 | 0.3 | 0 | 0 | 0 | 10 | 10 | 10 | 10 | 10 |
|   | 0.5 | 0 | 0 | 0 | 10 | 10 | 10 | 10 | 10 |
| 3 | 0.3 | 0 | 0 | 0 | 10 | 10 | 10 | 10 | 10 |
|   | 0.5 | 0 | 0 | 0 | 10 | 10 | 10 | 10 | 10 |

Note.—0=Not damaged.
10=Completely destroyed.

on peas, carrots, wheat and weeds in a quantity of 1 kg. of active substance per hectare, suspended in 800 liters of water per hectare. As can be seen from the following stated values, agents (2) and (3) of the invention have a much greater selectivity than the known preparation (1), that is, while the weeds were completely destroyed by the quantities used per hectare of the compounds of the invention, the cultivation plants remaining intact, the reference product greatly harmed also the cultivation plants.

| | Peas | Carrots | Wheat | Mustard (Sinapis spec.) | Stellaria (S. media) | Frenchweed (Galinsoga parv.) | Groundsel (Senecia vulg.) | Chamomile (Matricaria chamomilla) |
|---|---|---|---|---|---|---|---|---|
| Compound: | | | | | | | | |
| 1 | 5 | 5 | 7 | 10 | 10 | 10 | 10 | 10 |
| 2 | 0 | 0 | 0 | 10 | 10 | 10 | 10 | 10 |
| 3 | 0 | 0 | 0 | 10 | 10 | 10 | 10 | 10 |

Note.—0=Not damaged.
10=Completely destroyed.

EXAMPLE 9

In the greenhouse, in the treatment before germination of cultivation plants and weeds, the compounds listed in Example 8 were sprayed on bare sandy soil in a quantity of 1 kg./ha. of active substance, emulsified in 800 liters of water/hectare. The active pattern was the same as for post-germination treatment. The agents of the invention proved to be much more compatible for the cultivations than the reference preparation.

| | Peas | Carrots | Wheat | Mustard (Sinapis spec.) | Stellaria (S. media) | Frenchweed (Galinsoga parv.) | Groundsel (Senecia vulg.) | Chamomile (Matricaria chamomilla) |
|---|---|---|---|---|---|---|---|---|
| Compound: | | | | | | | | |
| 1 | 6 | 1 | 7 | 10 | 10 | 10 | 10 | 10 |
| 2 | 0 | 0 | 0 | 10 | 10 | 10 | 10 | 10 |
| 3 | 0 | --- | 4 | 10 | 10 | 10 | 10 | 10 |

Note.—0=Not damaged.
10=Completely destroyed.

EXAMPLE 11

In open field tests of treatment before and after germination of crops and weeds, the compounds listed in Example 8 were sprayed in quantities of 1 and 4 kg. of active ingredient per hectare as aqueous emulsions or suspensions. In both treatment methods the agents according to the invention proved much more compatible for the cultivations than the reference preparation. The following list is indicative of the plant shown in the table:

A—Summer wheat
B—Summer barley
C—Peas
D—Centaurea ssp.
E—Vicia ssp.
F—Sinapis ssp.
G—Chenopodium album
H—Spergula arv.
I—Polygonum conv.
K—Senecio Vulg.
L—Matricaria chamomilla
M—Lamium amplexicaule

| Compound | Kg. of active ingredient/ha. | A | B | C | D | E | F | G | H | I | K | L | M |
|---|---|---|---|---|---|---|---|---|---|---|---|---|---|
| Pre-germination method: | | | | | | | | | | | | | |
| 1 | 1 | 6 | 6 | 8 | 0 | 0 | 0 | 0 | 0 | 0 | 0 | 0 | 0 |
|   | 4 | 0 | 0 | 0 | 0 | 0 | 0 | 0 | 0 | 0 | 0 | 0 | 0 |
| 2 | 1 | 10 | 10 | 10 | 0 | 0 | 0 | 0 | 0 | 0 | 0 | 0 | 0 |
|   | 4 | 10 | 10 | 10 | 0 | 0 | 0 | 0 | 0 | 0 | 0 | 0 | 0 |
| 3 | 1 | 10 | 10 | 10 | 0 | 0 | 0 | 0 | 0 | 4 | 2 | 0 | 0 |
|   | 4 | 10 | 10 | 10 | 0 | 0 | 0 | 0 | 0 | 0 | 0 | 0 | 0 |
| Post-germination method: | | | | | | | | | | | | | |
| 1 | 1 | 6 | 8 | 8 | 0 | 0 | 0 | 0 | 0 | 0 | 0 | 0 | 0 |
|   | 4 | 0 | 0 | 0 | 0 | 0 | 0 | 0 | 0 | 0 | 0 | 0 | 0 |
| 2 | 1 | 10 | 10 | 10 | 0 | 0 | 0 | 0 | 0 | 0 | 0 | 0 | 0 |
|   | 4 | 10 | 10 | 10 | 0 | 0 | 0 | 0 | 0 | 0 | 0 | 0 | 0 |
| 3 | 1 | 10 | 10 | 10 | 0 | 0 | 0 | 0 | 0 | 2 | 0 | 2 | 0 |
|   | 4 | 10 | 10 | 10 | 0 | 0 | 0 | 0 | 0 | 0 | 0 | 0 | 0 |

Note.—0=Completely destroyed.
10=Not damaged.

EXAMPLE 12

In the greenhouse, tests, before germination, crops and weeds, were sprayed with evenly divided active ingredient in quantity of 1 kg. per hectare, suspended in 800 liter of water per hectare:

(1) N-(3-4-dichlorophenyl)-N'-methyl urea,
(2) N-(3,4-dichlorophenyl-N',N'-dimethyl urea,
(3) N-(3,4-dibromophenyl)-N',N'-dimethyl urea,
(4) N-(3,4-dibromophenyl)-N'methoxy-N'-methyl urea.

It was found that the agents according to the invention show a much greater selectivity than the known preparations. The agents of the invention completely destroyed the weeds, but the crops remained without visible damage, while the reference products 1 and 2 damaged the crops or even destroyed them.

| | Peas | Carrots | Wheat | Mustard (Sinapis spec.) | Stellaria (S. media) | French-weed (Galinsoga parv.) | Ground sel (Senecia vulg.) | Chamomile 2 (Matricaria chamomilla) |
|---|---|---|---|---|---|---|---|---|
| Compound: | | | | | | | | |
| 1 | 4 | 9 | 3 | 0 | 0 | 0 | 0 | 0 |
| 2 | 3 | 0 | 2 | 0 | 0 | 0 | 0 | 0 |
| 3 | 10 | 10 | 10 | 0 | 0 | 0 | 0 | 0 |
| 4 | 10 | 10 | 10 | 0 | 0 | 0 | 0 | 0 |

NOTE.—10=Not damaged.
0=Completely destroyed.

EXAMPLE 13

In the greenhouse tests, weeds were destroyed while in the cotyledon stage of crops and weeds, but spraying evenly divided on the plants, in a quantity of 1 kg. of active ingredient per hectare, suspended in 800 liters of water per hectare:

(1) N-(3,4-dichlorophenyl)-N'-methoxy-N'-methyl urea
(2) N-(3,4-dichlorophenyl)-N',N'-dimethyl urea
(3) N-(3-chloro-4-bromophenyl)-N'-N'-dimethyl urea
(4) N-(3,4-dibromophenyl)-N',N'-dimethyl urea
(5) N-(3,4-dibromophenyl)-N'-methoxy-N-methyl urea Furthermore, in the treatment after germination of the plants, the agents according to the invention proved much more compatible for the crops than the reference preparations 1 to 3.

The following example shows that already with a quantity of 0.3 kg. of active ingredient per hectare a total destruction of the weeds was attained.

EXAMPLE 14

In an experiment in the greenhouse, the agents of the invention containing N - 3,4 - dibromophenyl) - N'-N'-dimethyl urea and N - (3,4 - dibromophenyl-N'-methoxy-N'-methyl urea were sprayed before and after the germination of peas, carrots, wheat, and the weeds mustard, stellaria, french-wood, groundsel, and chamomile in a quantity of 0.3 kg. of active ingredient per hectare, suspended in 800 liters of water hectare. The weeds were completely destroyed without damage to the crops.

EXAMPLE 15

In an open field experiment, the compounds listed in the following table were sprayed as aqueous suspensions before and after the germination of summer wheat, summer barley, and peas in the quantities of 1 and 4 kg. of active ingredient per hectare. In the case of the agents 1 and 2 according to the invention, total destruction of the existing weeds with perfect protection of the crops was observed, while the known agents 3 and 4 damaged also the crops.

| | Peas | Carrots | Wheat | Mustard (Sinapis spec.) | Stellaria (S. media) | French-weed (Galinsoga parv.) | Ground sel (Senecia vulg.) | Chamomile (Matricar chamomilla) |
|---|---|---|---|---|---|---|---|---|
| Compound: | | | | | | | | |
| 1 | 5 | 5 | 3 | 0 | 0 | 0 | 0 | 0 |
| 2 | 6 | 0 | 3 | 0 | 0 | 0 | 0 | 0 |
| 3 | 3 | 0 | 0 | 0 | 0 | 0 | 0 | 0 |
| 4 | 10 | 10 | 10 | 0 | 0 | 0 | 0 | 0 |
| 5 | 10 | 10 | 10 | 0 | 0 | 0 | 0 | 0 |

NOTE.—10=Not damaged.
0=Completely destroyed.

| Compound | Kg. of active ingredient/ha. | Plants as in Example 11 | | | | | | | | | | | |
|---|---|---|---|---|---|---|---|---|---|---|---|---|---|
| | | A | B | C | D | E | F | G | H | I | K | L | M |
| Pre-germination method: | | | | | | | | | | | | | |
| 1. N-(3,4-dibromophenyl)-N',N-dimethyl urea | 1 | 10 | 10 | 10 | 0 | 0 | 0 | 0 | 0 | 0 | 0 | 0 | 0 |
| | 4 | 10 | 10 | 10 | 0 | 0 | 0 | 0 | 0 | 0 | 0 | 0 | 0 |
| 2. N-(3,4-dibromophenyl)-N'-methyl-N'-methoxy urea | 1 | 10 | 10 | 10 | 0 | 0 | 0 | 0 | 0 | 0 | 0 | 0 | 0 |
| | 4 | 10 | 10 | 10 | 0 | 0 | 0 | 0 | 0 | 0 | 0 | 0 | 0 |
| 3. N-(3,4-dichlorophenyl)-N',N'-dimethyl urea | 1 | 3 | 5 | 3 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |
| 4. N-(3,4-dichlorophenyl)-N'-methyl-N'-methoxy urea | 1 | 6 | 6 | 6 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |
| Post-germination method: | | | | | | | | | | | | | |
| 1. N-(3,4-dibromophenyl)-N'-N'-dimethyl urea | 1 | 10 | 10 | 10 | 0 | 0 | 0 | 0 | 0 | 0 | 0 | 0 | 0 |
| | 4 | 10 | 10 | 10 | 0 | 0 | 0 | 0 | 0 | 0 | 0 | 0 | 0 |
| 2. N-(3,4-dibromophenyl)-N'-methyl-N'-methoxy urea | 1 | 10 | 10 | 10 | 0 | 0 | 0 | 0 | 0 | 0 | 0 | 0 | 0 |
| | 4 | 10 | 10 | 10 | 0 | 0 | 0 | 0 | 0 | 0 | 0 | 0 | 0 |
| 3. N-(3,4-dichlorophenyl)-N', N'-dimethyl urea | 1 | 4 | 4 | 5 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |
| 4. N-(3,4-dichlorophenyl)-N'-methyl-N'-methoxy urea | 1 | 6 | 8 | 8 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |

Note.—0=Completely destroyed.
10=Not damaged.

EXAMPLE 16

In the production of an emulsifiable concentrate the following ingredients were mixed together:

| | Percent |
|---|---|
| N - (3,4 - dibromo - phenyl)N'-methoxy-N'-methyl urea | 25 |
| Emulsifier on a base of calcium dodecyl benzenesulfonate | 15 |
| Isophorone | 25 |
| Xylene | 35 |

An emulsion was obtained which can be shaken preparatory to use. The percentages indicated are by weight.

EXAMPLE 17

In the production of a dispersible (wettable) powder, the following ingredients were mixed together and finely ground with the aid of an air jet mill or the like. There resulted a powder dispersible in water.

| | Percent |
|---|---|
| Active ingredient | 50 |
| Calcium lignin sulfonate | 12 |
| Wetting agent on a base of sodium beta-(oleyl-methylamino)-ethane sulfonate | 3 |
| Attaclay | 35 |

It will be noted from the foregoing description that there are provided selective herbicidal agents containing new urea derivatives which are effected not only in the greenhouse, but also in open field use.

Their method of preparation and application as exemplified herein are indicative of their effectiveness in killing weeds such as shown herein.

While several examples of the preparation and use of herbicides herein are given, it is to be understood that changes may be made as to use and arrangement of the compounds without departing from the spirit and scope of the invention as claimed.

We claim:
1. N - (3 - chloro - 4 - iodophenyl)-N'-methoxy-N'-methyl urea.

References Cited

UNITED STATES PATENTS

| | | | |
|---|---|---|---|
| 2,655,444 | 10/1953 | Todd | 71—120 |
| 2,655,447 | 10/1953 | Todd | 71—120 |
| 2,726,150 | 12/1955 | Wolter | 71—120 |
| 3,190,740 | 6/1965 | Wolter | 71—120 |
| 3,288,586 | 11/1966 | Littler | 260—453 XR |
| 3,288,851 | 11/1966 | Martin et al. | 71—120 XR |

JOSEPH P. BRUST, *Primary Examiner.*

U.S. Cl. X.R.

71—120; 260—453, 553